William E. Stevenson, Jr.
Glen V. Dorflinger
INVENTORS

Dec. 4, 1962    W. E. STEVENSON, JR., ET AL    3,066,759
LUBRICATING APPARATUS
Filed March 14, 1960    3 Sheets-Sheet 3
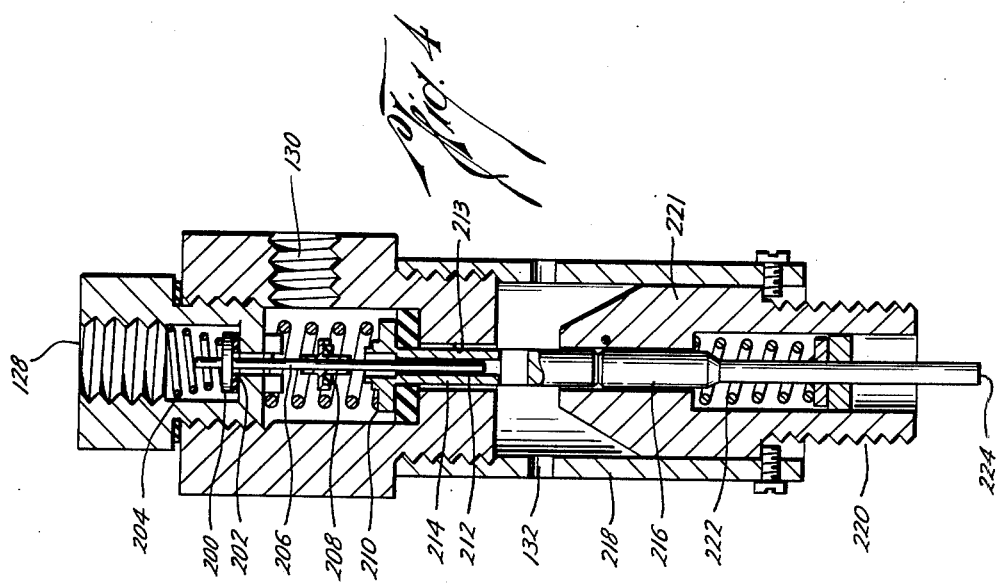
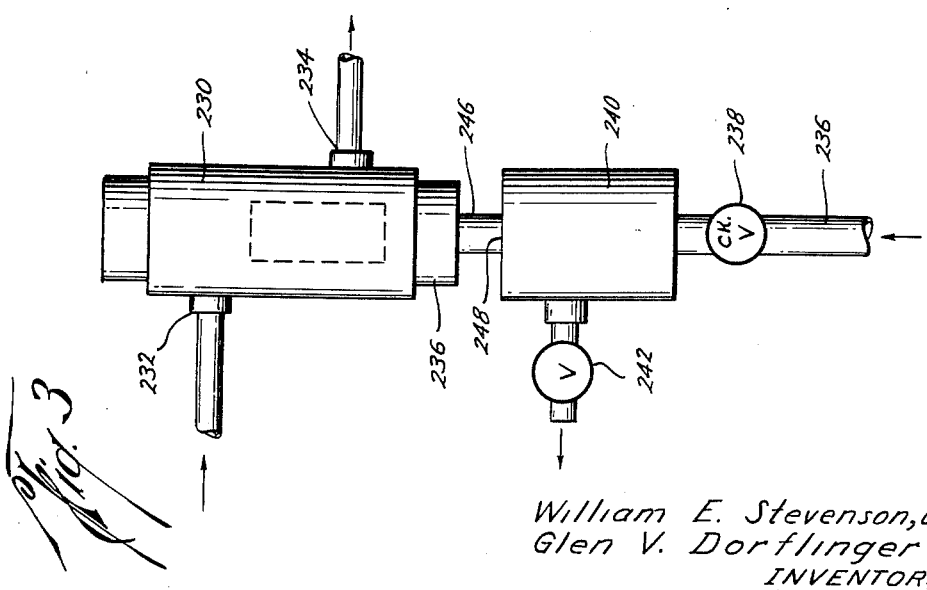
William E. Stevenson, Jr.
Glen V. Dorflinger
INVENTORS
BY
ATTORNEYS 3,066,759
Patented Dec. 4, 1962

3,066,759
LUBRICATING APPARATUS
William E. Stevenson, Jr., and Glen V. Dorflinger, Houston, Tex., assignors to Stewart-Warner Corporation, a corporation of Virginia
Filed Mar. 14, 1960, Ser. No. 14,722
16 Claims. (Cl. 184—7)

The present invention relates to a lubricating apparatus, and more particularly, to an improvement in a lubricating apparatus having a pneumatic operating and pneumatic safety system.

Generally, the present invention is directed for use with a lubricating system which includes a series of constant volume measuring or metering valves by which lubricant is delivered to lubricating points on a machine or apparatus in response to lubricant pressure alternately applied and relieved to the valve inlets. The present invention is directed toward various improvements in a centralized lubricating system which includes a series of such metering valves.

It is an object of the present invention to provide an improved automatic centralized lubricating system which is both pneumatically and hydraulically energized and controlled.

It is a further object of the present invention to provide a pneumatic-hydraulic timing mechanism for actuating and controlling the operation governing the supply of the lubricant to the metering valves.

Another object is the provision of a pneumatic-hydraulic cycling valve which controls the lubricant supply feeds to the metering valves by providing a container having a partition including a passageway, a piston on either side of the partition, and incompressible liquid between the pistons and controlling the rate of movement of the pistons when a compressible gas is alternately applied against the pistons by controlling the velocity of the incompressible liquid passing through the passageway.

A further object is the provision of a pneumatic safety system which will indicate when there is a failure in the lubricating system and/or in any of the measuring valves or in any of the lubricating outlet lines from the measuring valves.

A still further object of the present invention is the provision of a pneumatic signal valve attached to each metering valve and actuated by the metering valve on the completion of a cycle to allow the passage of air through the pneumatic valve and the provision of a pneumatic signal valve in each metering valve outlet line to allow the passage of air through the pneumatic valves in the outlet lines when the outlet lines receive periodic pressure surges thereby providing a pneumatic safety system which may be operated in gas hazardous or other locations to indicate various failures in the lubricating system.

Figure 1:
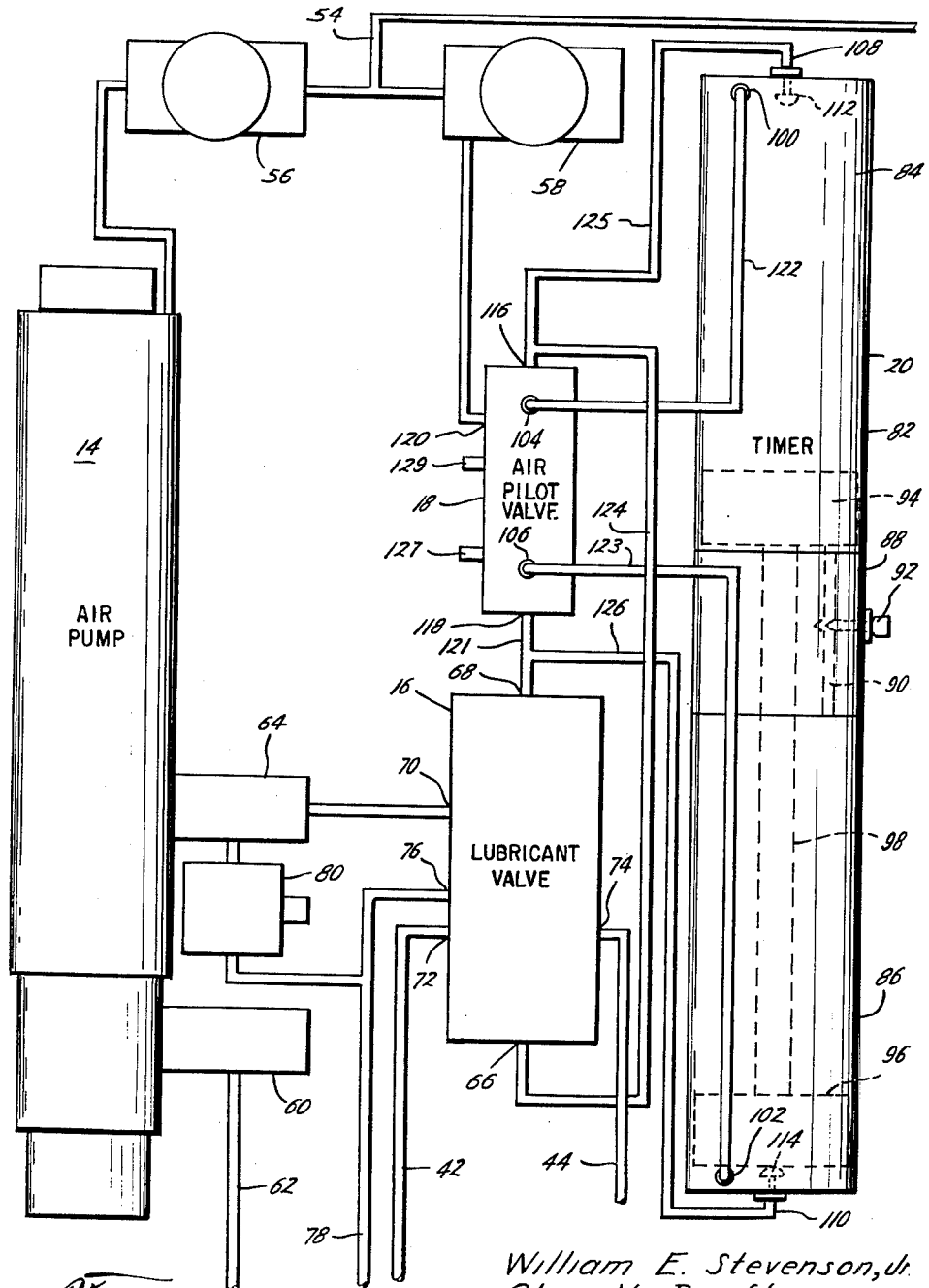
Figure 2:
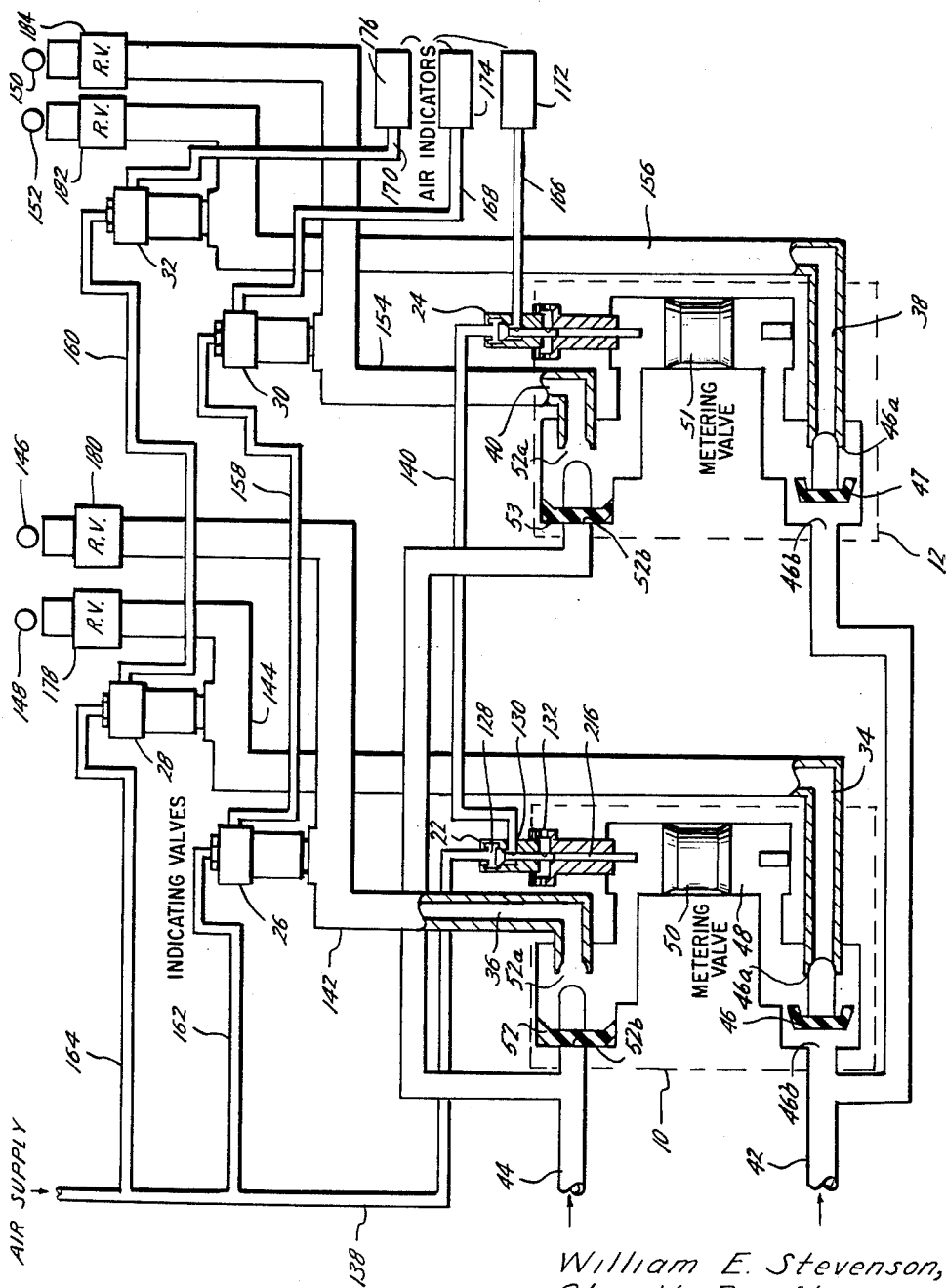

Other and further objects, features and advantages will be apparent from the following description of a presently preferred embodiment of the invention, given for the purpose of disclosure and taken in conjunction with the accompanying drawings, where like character references designate like parts throughout the several views, and where FIGURE 1 is a diagrammatic view illustrating part of the lubricating apparatus of the present invention, FIGURE 2 is a diagrammatic view, partly in section, which in conjunction with FIGURE 1 illustrates the lubricating apparatus of the present invention, FIGURE 3 is a schematic view of one type of a pneumatic safety monitoring device, and FIGURE 4 is an enlarged elevational view, partly in cross-section of a three-way pneumatic safety valve.

For purposes of illustration the invention is shown herein in an application with a duel line type measuring valve, it being understood that this is intended by way of example only, and that the invention is capable of use with other types of conventional measuring valves.

Referring now to the drawings, the lubricating system of the present invention generally includes a series of metering or measuring valves 10 and 12 (FIGURE 2), here shown as two in number although any desired number could be used depending upon the number of lubricating points to be serviced. Also the system includes an air pump 14 (FIGURE 1) for supplying lubricant to the metering valves from a lubricant reservoir (not shown), an air pilot operated hydraulic valve 16 governing the connection of the lubricant supply from the pump 14 to the measuring valves, an air pilot valve 18 for shifting the hydraulic lubricant governing valve 16, and a pneumatic-hydraulic timing device 20 which controls the cycle of operation of the air pilot valve 18. Additionally, pneumatic signal valves 22 and 24 are provided which are connected to the measuring valves 10 and 12, respectively, to indicate a failure of operation in the system or in valves 10 and 12, and pneumatic signal or indicating valves 26, 28, 30 and 32 are provided in the outlet lines of the metering valves which indicate a failure in the outlet lines.

Referring now to FIGURE 2, the measuring or metering valves 10 and 12 may be of the Type II as manufactured by the Alemite Division of Stewart-Warner Corporation, of Chicago, Illinois. These measuring valves are adapted to deliver lubricant to alternate passages 34, 36 and 38, 40, respectively. Each of the valves 10 and 12 are served by two lubricant supply lines 42 and 44 which are alternately pressurized and relieved to alternately supply a measured volume of lubricant alternately out each valve's outlet ports. Referring now to metering valve 10, as lubricant enters supply line 42, valve 46 opens the valve inlet 46b and closes the port outlet 46a to passageway 34, causing the lubricant to flow into the body 48 moving the piston 50 upwardly and causing the lubricant above the piston 50 to move valve 52 to close the valve inlet from supply line 44 and open port outlet 52a to passage 36 whereby a measured quantity of lubricant is forced out the passageway 36 until the travel of the piston 50 is stopped. When the lubricant pressure in supply line 42 is vented and lubricant pressure is applied to supply line 44 the action of the valve is reversed with the piston 50 moving downwardly causing the valve 46 to close the inlet 46b from line 42 and open the port outlet 46a thereby discharging a measured quantity of lubricant out port outlet 46a to passage 34. Thus, lubricating points 146 and 148, respectively, are alternately lubricated through conduits 142 and 144, respectively, by the action of metering valve 10. Similarly, metering valve 12 alternately supplies lubricating points 150 and 152 through conduits 154 and 156, respectively. As these measuring valves 10 and 12 are commercially available, no further description is believed necessary.

It is preferable that any system of metering valves such as the dual line system here shown be automatically controlled, timed, and monitored with suitable safety or signal devices to detect system failures. It is an object of this invention to provide these features.

Referring to FIGURE 1, air from a suitable supply source (not shown) is supplied through air inlet line 54 to air regulators 56 and 58. Air from regulator 56 is then supplied to an air operated pump 14 which may be a Model No. 6295, commercially available from the Alemite Division of Stewart-Warner Corporation, of Chicago, Illinois. Lubricant is supplied to the inlet port 60 of the pump 14 through supply line 62 from a lubricant source or reservoir (not shown) and is pumped out of pump outlet port 64 under suitable pressure to the pilot actuated lubricant control valve 16 which alternately operates to pressurize lubricant supply lines 42 and 44 to the metering valves 10 and 12 (FIGURE 2). Lubricant control valve 16 is an air pilot operated, four-way shifting valve and is commercially available as Model BP-HYD from the Beckett-Harcum Company, Inc., of Wilmington, Ohio. This valve 16 has a movable shifting spool which is pilot controlled by alternating air pressure through pilot ports 66 and 68. That is, when air is admitted to pilot port 68 and vented from port 66, the internal valve spool (not shown) will move away from the port 68 and the lubricant entering through inlet 70 from the pump 14 is discharged from the valve 16 through outlet port 72 and to lubricant supply line 42. When air is alternately applied to port 66 and vented from port 68, the internal spool is shifted away from port 66 and the lubricant flow is ported to outlet 74 and to supply line 44. During the operation of the four-way lubricant control valve 16, the supply line which is not being charged with lubricant is vented to opening 76 of the valve 16 and back to the lubricant reservoir. This venting is necessary to allow for the directional change to be accomplished in the metering valves downstream when the lubricant pressure is changed from one supply line to the second supply line. An adjustable relief valve 80 is provided and set at the desired pressure above the regular lubricant operating pressure of the system as a safety device and is ported to the lubricant reservoir.

A conventional four-way valve double pilot operated valve 18 is provided to supply the alternate pulses of air to the pilot ports 66 and 68 of the lubricant control valve 16. A commercially available type, Model BV403 from the Modernaire Corporation, of San Leandro, California, has been found to be satisfactory. In order to provide for automatic cycling and operation of the lubricating system a timing device 20 is provided to control the operation of pilot valve 16 (FIGURE 1). This device generally includes a cylindrical chamber 82 divided into two compartments 84 and 86 by a partition 88. The partition 88 includes a passageway 90 communicating between the compartments 84 and 86 and a valve means 92 such as a needle valve is provided to adjust the volume flow of fluid through the passageway 90. Movable pistons 94 and 96 are provided in the compartments 84 and 86, respectively. If desired these pistons may be interconnected by a rod 98 passing through the partition 88. An incompressible fluid is provided, such as hydraulic fluid, between the pistons 94 and 96 and the partition 88. Air inlet ports 100 and 102 are provided near the ends of the compartments 84 and 86, respectively, to alternately supply air to move the pistons 94 and 96 in alternate directions. The inlet ports 100 and 102 are supplied air from the pilot valve 18 from pilot valve outlets 104 and 106, by means of conduits 122 and 123 respectively, as will be more fully described hereinafter. Vent lines 108 and 110 are provided at the ends of chambers 84 and 86, respectively. Vent buttons 112 and 114 are provided in vent lines 108 and 110, respectively, which are actuated by the pistons 94 and 96, respectively, at the bottom of their strokes to open the vent lines 108 and 110 to the respective chambers 84 and 86. Let it be assumed that air is being supplied through the regulator 58 to the inlet port 120 of the air pilot valve 18, and that the pilot valve 18 is in a position to supply air through its port 104 to the chamber 84 of the timing device 20 and also to port 68 of the lubricant control valve through line 121. In this position the outlet ports 106 and 116 of the pilot valve 18 are closed to inlet port 120 and are vented to atmosphere through vent 129. As air enters the inlet 100 in the compartment 84 behind the piston 94 the piston 94 is driven downwardly forcing the hydraulic fluid on the other side of the piston 94 through the passageway 90 into chamber 86 thus allowing the piston 96 to move away from partition 88. The valve means 92 controls the rate of flow of the hydraulic fluid passing through the passageway 90 and thus controls the cycling rate of the lubricating system. Air in the chamber between the lower piston 96 and the end of chamber 86 is discharged to the atmosphere through line 123, valve 18 and vent 129. As air continues to enter from inlet 100 the pistons 94 and 96 move downwardly until piston 96 contacts and actuates the vent button 114 to open the port to vent line 110 and vent the pressured air through line 126 from the reversing port 118 of the pilot valve 18 to the atmosphere through line 123, port 106 and vent 129 which reverses the position of the spool in pilot valve 18. Thus ports 106 and 116 of the pilot valve are opened to inlet 120, and ports 104 and 118 are closed venting them to the atmosphere through vent 127 of the pilot valve 18. At this point air enters the timing device 20 through the inlet port 102 in the chamber 86 and the timing cycle is reversed while the pilot valve 18 supplies air to the inlet port 66 of the lubricant valve 16 through line 124 which in turn closes the outlet supply line 42 and opens the outlet supply line 44 to the metering valves. Thus, the timing device 20 provides an automatic and non-electrical type of timing device which may be adjusted to provide the desired adjustable time sequence to alternately supply lubricant from the pump to the metering valves 10 and 12 through the supply lines 42 and 44.

Referring now to FIGURE 2, the structure and operation of the pneumatic safety signal system can best be seen. It the past it has been conventional to provide an end of the line pressure switch to provide a warning as to the operation of the entire system and to provide counters on the individual metering valves to provide visual indication of the operation of the individual valves. The pneumatic safety system of the present invention provides a positive reaction in the form of a pneumatic impulse that repeats itself at the end of every complete metering valve cycle to indicate and detect a failure in supplying lubrication to each individual lubricating point. For each metering valve of the dual line type such as metering valves 10 and 12 a normally closed three-way air signal valve 22 or 24, respectively, is provided. Similarly, three-way air signal valves 26, 28, 30 and 32 are provided in the outlet lines 142, 144, 154 and 156, respectively, to provide a signal which indicates a failure to supply lubrication in these outlet lines.

Reference is now made to FIG. 4 for a description of a three-way air signal valve which may be used on the metering valves 10 and 12 or on the metering valve output lines 142, 144, 154, 156. The valve includes an upper member 127 having an inlet 128 and an outlet 130. Within the member 127 is a valve 200 which is normally held in a closed position against valve seat 202 by a spring 204. A valve stem 206 carrying a valve closure member 208 along its mid-portion has one end rigidly connected to the valve 200 and its other end terminating within a passageway 212 in a movable valve seat member 210 positioned within an aperture 213 at the other end of the upper member 127. The stem 206 fits loosely within the passageway 212 in the movable seat member 210, thus allowing the passage of air therethrough from the outlet 130 for a purpose to be described hereinafter. A tubular adaptor 218 threadedly engages the end of the upper valve member 127 and supports an actuator member 221 by means of set screws. The actuator member 221 comprises a movable stem 216 which is held in a normally downward position by the force of a spring 222 on a retaining member 223 secured to the shaft 216. The tubular adaptor 218 holds the actuator member 221 so that its movable shaft 216 is aligned and engageable with the end of the movable valve seat 214 in the upper valve member 127. The actuator member 221 has threads 220 for securing the valve to a conventional measuring valve body or to a threaded connection in one of the outlet lines. Vent holes 132 are provided in the tubular adaptor 128 to complete the communication between the outlet 130 and atmosphere through the passageway 212 in the movable valve seat 214. It may thus be seen that when the actuator pin 216 is caused to rise, it pushes the movable seat 214 upward to engage the valve closure member 208 on the shaft 206 thus blocking the communication between the outlet 130 and atmosphere through the passageway 213. Further upward movement of the actuator pin 216 causes the stem 206 to rise and unseat valve 200 from its seat 202 and thus provide communication between inlet 182 and outlet 130 in the upper valve member 127.

In pneumatic signal valves 22 and 24 the stems 216 are actuated by the movable pistons 50 and 51, respectively. However in the outlet line valves 26, 28, 30 and 32 the cross-sectional area 224 of the stem 216 is made of a sufficient area so as to be pushed upwardly on predetermined pressure surges in these outlet lines acting against the bottom cross-sectional area 224 of the stem 216 thereby hydraulically actuating the signal valves.

The valve inlet 128 is connected to any suitable source of air supply. For instance valve 22 is connected by means of conduit 138 (FIGURE 2) to a suitable air source and thus on the completion of each cycle of metering valve 10 the three-way pneumatic signal valve 22 is actuated by the metering valve piston 50 acting on the stem 216 to pass an impulse of air from conduit 138 through the inlet 128 and the outlet 130. As the metering valve piston 50 reverses position, the valve 22 closes the inlet port 128 and the outlet 130 is vented through the passageway 212 to the vents 132. Three-way pneumatic signal valve 24 on metering valve 12 is connected in series to valve 22 by the air line 140 and is thus connected therethrough to the same air supply source.

Three-way pneumatic valves 26, 28, 30 and 32 are mounted in a similar manner in the discharge lines of each of the meter valves 10 and 12. Pneumatic valves 26 and 28 are connected in discharge lines 142 and 144, respectively, which provide the lubrication line from the lubrication delivery passages 36 and 34, respectively, to desired lubrication points 146 and 148, respectively. Similarly, pneumatic three-way valves 30 and 32 are placed in the discharge lines 154 and 156 leading from metering valve 12 to each lubricating point 150 and 152, respectively. Therefore, as each discharge line is pressurized causing a momentary surge of lubricant pressure the respective actuating pins 216 in those lines will rise and open the three-way air signal valve and permit the passage of an air impulse therethrough. In a multiple meter valve installation one outlet port of each dual line metering valve discharges lubricant simultaneously with one of the outlet ports of each of the other metering valves in the system. As shown in FIGURE 2, outlet passage 36 of metering valve 10 discharges lubricant at the same time that the outlet passage 40 of metering valve 12 discharges lubricant. And while individual indicating or detecting devices such as 172, 174 or 176 could be connected to each of the individual signaling valves in each discharge line to detect a failure, it is preferable to connect all of the pneumatic signal valves which are actuated simultaneously in series with an air source to reduce the amount of indicating equipment that would be required to detect and indicate failures in individual discharge lines. Therefore, since the discharge passage 34 of metering valve 10 and discharge passage 38 of metering valve 12 are opened simultaneously, the safety valves 28 and 32 connected to these ports, are connected in series to a source of air by conduit lines 160 and 164. Similarly, signal valves 26 and 30 are connected in series to an air source by conduits 158 and 162.

The three-way signal valves 22 and 24 which are mounted on the body of the meter valves 10 and 12, respectively, are also connected in series to an air supply through conduits 138 and 140 and are actuated simultaneously at the completion of each cycle so that an air pulse will be provided from the air supply through conduit 138, valve 22, conduit 140, valve 24, conduit 166 to detecting device 172 if all of the metering valves, 10 and 12, operate correctly. However, should there be a failure of operation in any of the metering valves, the pneumatic signal valve connected to that metering valve will not operate and will prevent the passage of an air pulse through the series connection to conduit 166 and detecting device 172.

Similarly, all of the pneumatic three-way safety valves connected to the simultaneously charged discharge lines are connected in series between the air sources and the detecting devices, valves 26 and 30 being connected in series through line 158 from the supply source to an indicating line 168 and valves 28 and 32 being connected in series through line 160 from an air supply source to an indicating line 170. Thus air impulses will be provided to the detecting devices 174, and 176, respectively, only if there is no failure in any of the lubricating discharge lines monitored by these series circuits.

Therefore, there are three sets of series pneumatic circuits each connected to and providing an air impulse to the lines 166, 168 and 170, respectively, at the completion of every cycle of the lubrication system if there are no failures in the system. Of course, if desired, an individual warning signal could be provided for each signal valve by placing each of them in parallel to an air source; however, this becomes uneconomic usually in large installations.

Any suitable detecting, indicating or detecting means could be used, either electrical or pneumatic, to be actuated by a failure in the lubricating system. For example, a time out device could provide an indication or alarm at predetermined intervals such as every twenty seconds, unless the time out device is charged by an air impulse from the air indicating series line to which it is connected. Thus, assuming a meter valve cycling rate of eight seconds an air pulse should be obtained in each of the air lines 166, 168 and 170 every eight seconds so that if there is no failure in the system the time out device will not be actuated and the warning lights and/or other indicators will not be actuated. However, if in any of the pulse lines 166, 168 or 170 there is not received for two continuous cycles an air pulse the time out means attached to that line will be actuated indicating a failure in that series of safety valves so that the operator or maintenance personnel need only to check the equipment connected to that series circuit which would cause such an indication failure. Therefore, a failure in one of the metering valves will indicate such failure in conduit line 166 by a failure to provide an air pulse at the proper interval to the indicating device 172. A failure in one of the discharge lines such as a broken line or failure of a check valve in the metering valve will fail to produce an air pulse in line 168 and its corresponding indicating means 174. Similarly, a failure in the discharge lines pressurized on actuation of the supply line 44 will result in a failure to supply an air impulse in line 170 and its corresponding indicating means 176 will time out and signal that failure. If desired, relief valves 178, 180, 182 and 184 may be provided in each of the discharge lines 144, 142, 156 and 154, respectively.

Referring now to FIGURE 3, a pneumatic signal or time out device which is suitable for use in the indicating means 172, 174 or 176 in FIGURE 2 is shown. An air control valve 230 is provided which is a three-way pilot valve which is held normally opened between the air input inlet 232 and the air outlet 234 by means of a spring return (not shown). This valve is closed between the inlet and outlet when the valve is pressured by air at the pilot inlet 236. A valve such as Model CRV 304 of the Modernair Corporation has been found satisfactory. Therefore, an outside air source (not shown) is connected to the inlet port 232 and the outlet port 234 is connected to an air horn or other suitable signal indicator or controls (not shown). The pilot inlet conduit 236 may be suitable connected to any of the impulse lines 166, 168 or 170 (FIGURE 2) to recieve an air impulse which would be passed through the directional check valve 238 into an air reservoir 240. Attached to the reservoir 240 is an adjustable time bleeding valve 242 which may be adjusted to vent the air pressure in the air reservoir 240 at any desirable rate. The outlet 248 of air reservoir 240 is connected in fluid communication to the pilot inlet 236 of the valve 230 by the connection 246. Thus, the air reservoir will receive pulses from the impulse line to which it may be connected at a rate to maintain suitable pressure to the pilot inlet 236 of the valve 230 so as to maintain the valve in a closed position to prevent passage of air therethrough and sound an alarm to indicate a failure. However, if there is a failure in the lubricating system and an air impulse is not periodically passed into the chamber 240, the air pressure in that chamber will be depleted by being slowly vented through the adjustable bleeding valve 242 thereby allowing the air control valve 230 to be actuated and sound the alarm. Of course, various other time out devices, both pneumatic and electrical could be provided.

In operation, the present invention will provide a centralized lubricating system utilizing a series of metering or measuring valves with an automatic timing and operating cycle which lubricates desired lubricating points at predetermined cycles. It also provides an entirely pneumatic-hydraulic control and failure detecting system which is desirable in hazardous applications such as commerical gas compressor pumping stations where electrical apparatus would not be desired.

Referring to FIGURE 1, in use, a continuous and automatic lubrication cycle is commenced by supplying air through conduit 54 from an air source (not shown) to air regulators 56 and 58. Air from regulator 56 actuates the air pump 14 and provides a continuous supply of lubricant under pressure from a suitable lubricant source or reservoir (not shown) to the pump inlet 60 and through the pump outlet 64 to the lubricant control valve 16 at the inlet port 70. At the same time air is supplied from the air regulator 58 to the air pilot valve 18 at inlet port 120 so that the actuation and cycling of the lubricant control valve 16 may be controlled. Assuming that valve ports 106 and 116 of the pilot valve 18 are closed and the ports 104 and 118 are open, air will be supplied from valve 18 through conduit 122 to the inlet port 100 of the timing mechanism 20 and also through conduit 121 to the inlet 68 of the directional control lubricating valve 16. The valve is caused to direct the pressurized lubricant from the pump and supply line 42 to the measuring valves 10 and 12 (FIGURE 2) so as to move the pistons 50 and 51 upwardly and discharge a measured volume of lubricant out of the discharge ports 36 and 40, respectively, and to lubricating points 146 and 150, respectively. When the pistons 50 and 51 reach the upper limits of their travel they contact and actuate pins 216 of the valves 22 and 24 at the same time and in turn move valve stems 206 of each valve upwardly to open valves 200 and provide air communication from the air supply through conduit 138, the series connected valves 22 and 24 the conduit 166 providing an air impulse to the indicating means 172 if the measuring valves 10 and 12 have correctly performed their operation. If any metering valve fails an air impulse will not be provided to the indicating mechanism 172 and there will be a signal or alarm given indicating this failure.

At the same time as the pistons are moved upwardly the impulse of pressure in the discharge lines 142 and 154 will actuate the valve stems 216 and thus stems 206 of the pneumatic three-way signal valves 26 and 30 allowing the passage of air through the series connected valves 26 and 30 from an air supply to provide an air impulse into indicating means 174 through the conduit 168. However, if either of the series connected valves 26 and 30 fails to operate through failure to receive a lubricant pulse due to a failure in the discharge lines or failure to receive lubricant from the metering valves the impulse will not be received by the indicating means 174 and an alarm or signal will be actuated to denote such a failure in one of these simultaneously acting discharge lines.

Therefore at this point in the cycle, lubricating points 146 and 150 have been lubricated. Referring now again to FIGURE 1, air is being supplied behind piston 94 in the chamber 84 of the timing mechanism 20, piston 94 is moving downwardly forcing the hydraulic fluid through the passageway 90 at a rate of speed adjusted as desired by the valve means 92 into chamber 84 forcing the piston 96 toward the end of chamber 86 until such time that the piston 96 actuates the vent button 110. When this occurs the pressurized air from port 118 is vented through line 126 to the atmosphere reversing the pilot valve 18. Reversing the pilot valve 18 opens ports 106 and 116 and closes ports 104 and 118 to the inlet 120 and vents them to the atmosphere through vent 129. When this occurs the pilot valve 18 directs air through the line 123 to the inlet 102 and starts the timing device 20 moving in the opposite direction and at the same time directs air through the conduit 124 to the lubricant directional valve inlet 66 causing this directional valve to reverse, direct the lubricant out the supply line 44, and vent the pressurized supply line 42 through vent outlet 76 of valve 16 and back to the lubricant source through conduit 78 in order that the metering valves 10 and 12 may reverse their direction and work against an unpressurized system.

Referring again to FIGURE 2, as the lubricant supply line 44 is pressurized the valves 52 and 53 in the metering valves 10 and 12, respectively, open and the valves 46 and 47, respectively, close. As the lubricant flows through the metering valve causing the pistons 50 and 51 to move downwardly the valve stems 216 of valves 22 and 24 are returned to their normal position closing the valve inlets 128 of valves 22 and 24 and venting the exhaust ports 130. Thus, the conduit lines 140 and 166 are vented in preparation for the next cycle. Similarly, valves 26 and 30 are similarly closed and the conduits 158 and 168 are vented in order to allow the indicating device 174 to become reactivated and proceed on its detecting cycle.

At the same time a metered amount of lubricant is discharged through the passages 34 and 38 of the valves 10 and 12, respectively, directing a metered amount of lubricant to the lubricating points 148 and 152, respectively. When this pressure surge occurs in the outlet lines 144 and 156 the pneumatic three-way signal valves 28 and 32 are simultaneously activated passing a surge of air from an air source to conduit 170 and the indicating means 176. Therefore, means 176 is reset at this point in the cycle and prevented from giving an indication of an alarm or failure if all of the series outlet valves actuated by the pressure in supply line 44, here valves 28 and 32 are properly operated.

Referring again to FIGURE 1, during this time, the air pressure entering the timing device 20 into the compartment 86 has been forcing the piston 96 toward partition 88 and forcing the hydraulic fluid through the passageway 90 to complete the second half of the cycle. The cycle is completed when the piston 96 encounters and actuates the vent switch 112 venting pressurized air from port 116 to the atmosphere and causing the pilot valve 18 to reverse thus closing ports 106 and 116 from the inlet 120 and opening ports 104 and 118 to the inlet 120 which in turn again reverses the supply of air to the lubricant control valve 16 by supplying air to the port 68, thereby depressurizing line 44, and pressurizing line 42 to complete the cycle.

It is thus seen that the cycling speed is regulated by controlling the speed of the hydraulic fluid through the passageway 90 while maintaining constant air pressures alternately on the pistons 94 and 96 in the timing device 20. It is also noted that the operation and control of this centralized lubricating system using metering valves may be made entirely pneumatic and hydraulic for use where electric controls are not desired such as in hazardous gas locations, etc. Furthermore, the provision of a pneumatic safety signal system is noted which determines and indicates various failures in the lubricating system and detects these failures for each cycle's operation and for each individual lubricating point and metering valve.

The foregoing signaling system will detect the following failures among others: (1) loss of lubricant to the metering valves 10 and 12 by either loss of air pressure to the pump 14, loss of lubricant supply to the pump 14, pinched or blocked supply lines 42 and 44 or broken supply lines 42 or 44, (2) broken or jammed pistons in the metering valves, (3) broken or pinched discharged lines 142, 144, 154 or 156, (4) loss of air to any of or malfunctioning of any of the pneumatic signalling valves, and (5) malfunctioning of any of the metering check valves.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. In a lubricating system including a plurality of measuring valves each adapted to deliver lubricant in response to pressure applied to said valves, a supply of lubricant under pressure, valve means controlling the connection of said supply to said measuring valves, an improved pneumatic failure indicating system comprising, first pneumatic valve means connected to each measuring valve and actuated by said measuring valve during each cycle of operation of the measuring valves, an air supply connected to said first valve means, pneumatically operable indicating means connected to said first valve means for indicating the operation of said measuring valves, second pneumatic valve means connected to an output of each measuring valve, an air supply connected to said second valve means, said second valve means being actuated upon a predetermined increase of lubricant pressure in said outputs and pneumatically operable indicating means connected to said second valve means for indicating an increase of a predetermined amount of pressure in said output of the measuring valves.

2. In a lubricating system including a plurality of measuring valves each adapted to deliver lubricant in response to pressure supplied to said valves, said valves having first and second outlet lines and interconnected inlets, a supply of lubricant under pressure, directional valve means governing the connection of said lubricant supplied to said measuring valves, an improved pneumatic safety system comprising, a first pneumatic valve connected to each measuring valve actuated by said measuring valve during each cycle of operation of said measuring valve, said first valves connected to each other in series, an air supply connected to said series of first pneumatic valves, pneumatically operable indicating means connected in series with said first valves for indicating the actuation of said series of first valves to indicate the operation of all of said measuring valves, a second pneumatic valve connected to each of said first output lines, a third pneumatic valve connected to each of said second output lines, said second and third valves adapted and constructed to be actuated upon a predetermined increase of pressure in said outlet lines, said second valves connected to each other in series, said third valves connected to each other in series, an air supply connected to said second and third valve series, and indicating means connected with said second and third pneumatic valve series for indicating the actuation of said second and third valve series to indicate a predetermined amount of pressure in said output lines.

3. The invention of claim 2 wherein the first, second and third pneumatic valves comprise a three-way valve which on actuation allows the passage of air from an inlet to a first outlet and on deactivation of the valve said inlet is closed and said first outlet is vented to a second outlet.

4. In a lubricating system including a plurality of hydraulic piston measuring valves each adapted to deliver lubricant to first and second outlets in response to pressure applied to said valves, a supply of lubricant under pressure, pneumatically pilot operated valve means governing the connection of said supply to said measuring valves, an improved pneumatic safety system comprising, first pneumatic valve means connected to each measuring valve and actuated by said measuring valve piston during each cycle of operation of said measuring valve, said first valve means interconnected with each other in series, an air supply connected to said series of said first valve means, indicating means connected with said series of first valve means and adapted to be actuated by the flow of air from said air supply and through said series of first valve means thereby indicating the operation of all of the measuring valves, second pneumatic valve means connected to each of the measuring valves' first outlets, third pneumatic valve means connected to each of the measuring valves' said second outlets, each of second and third valve means being normally closed to the passage of air and operable to open responsive to a surge of a predetermined pressure at said metering valve outlets, said second valve means connected in series with each other, said third valve means connected in series with each other, an air supply connected to said series of second valve means, an air supply connected to said series of third valve means, and pneumatic means connected with each series of second and third valve means indicating the passage of air through each of said series thereby indicating the actuation of all of said valves in a series.

5. The invention of claim 4 wherein the first, second and third valve means each comprise a three-way valve which when actuated allows the passage of air through an inlet to a first outlet and when deactuated closes the inlet and vents said first outlet to a second outlet.

6. In a lubricating apparatus including a plurality of hydraulic measuring valves adapted to deliver lubricant in response to pressure applied to said valves, a supply of lubricant under pressure, a pneumatically actuated lubricant control valve connected between and governing the connection of said supply with the measuring valves, a pneumatic pilot control valve actuating the lubricant control valve, the improvement in a timing device comprising a container, a partition in said container having a passageway, a piston in said container on each side of said partition, substantially incompressible fluid filling the container between said pistons, a pneumatic inlet from the pilot control valve to said container on the side of each piston remote from the partition, an outlet line in said container on the side of each piston remote from said partition, said outlet lines connected to opposing ends of said pilot control valve, and a vent button at each outlet line constructed and adapted to be actuated on contact by a piston for connecting said pneumatic inlets to said outlet lines.

7. The invention of claim 6 including adjustable valve means in said passageway controlling the amount of flow of the incompressible fluid through said passageway.

8. In a lubricating apparatus including a plurality of hydraulic measuring valves adapted to deliver lubricant in response to pressure applied to said valves, a supply of lubricant under pressure, a pneumatically actuated lubricant control valve connected between said supply and the measuring valves governing the connection of said supply with said measuring valves, the improvement in a timing device comprising a four-way pneumatic pilot control valve, said pilot valve including four ports, two of said ports being vented when said other two ports are open, an air supply connected to said pilot control valve; a hydraulic timer including, a container, a partition in said container having a passageway, a piston in said container on each side of said partition, hydraulic fluid filling said container between said pistons, a pneumatic inlet line from the pneumatic pilot control valve to said container on the side of each piston remote from the partition, one of said lines being connected to a closed port on the pilot valve while the other line is connected to an open port on said pilot valve, an outlet line in said container on each end, said outlet lines connected to opposite ends of said pilot control valve, and a vent button in each outlet line adapted to be actuated on contact by a piston for connecting said inlet lines to said outlet lines, a line from two of the pilot ports to the lubricant control valve, said lines connected to ports one of which is open while the other is closed.

9. The invention of claim 8 including an adjustable valve means in said passageway controlling the flow of the hydraulic fluid through said passageway.

10. In a lubricating system including a plurality of measuring valves each adapted to deliver lubricant in response to pressure applied to said valves, a supply of lubricant under pressure, valve means controlling the connection of said supply to said measuring valves, an improved pneumatic failure indicating system comprising, pneumatic valve means connected to each measuring valve and actuated by said measuring valve during each cycle of operation of the measuring valve, an air supply connected to said valve means, pneumatically operable indicating means connected to said pneumatic valve means for indicating the operation of said measuring valves.

11. In a lubricating system including a plurality of hydraulic piston measuring valves, each adapted to deliver lubricant to first and second outlets in response to pressure applied to said measuring valves, a supply of lubricant under pressure, pilot operated valve means governing the connection of said supply to said measuring valves, an improved failure indicating system comprising pneumatic valve means connected to each measuring valve and actuated by said measuring valve piston during each cycle of operation of said measuring valve, means for connecting said pneumatic valve means in series with each other, an air supply connected to said series of pneumatic valve means, pneumatically operable indicating means connected with said series of pneumatic valve means for indicating the flow of air from said air supply through said series of pneumatic valve means to indicate the operation of all of the measuring valves.

12. In a lubricating system including a plurality of measuring valves each adapted to deliver lubricant in response to pressure supplied to said valves, a supply of lubricant under pressure, valve means controlling the connection of said supply to said measuring valves, an improved pneumatic failure indicating system comprising, pneumatic valve means connected to the output of each measuring valve and actuated upon a predetermined increase of lubricant pressure in said outputs, an air supply conected to said second valve means, and pneumatically operable indicating means connected to said valve means for indicating an increase of a predetermined amount of pressure in the output of the measuring valves.

13. In a lubricating system including a plurality of hydraulic piston measuring valves, each adapted to deliver lubricant to an outlet in response to pressure applied to said measuring valves, a supply of lubricant under pressure, pneumatically pilot operated valve means governing the connection of said supply to said measuring valves, an improved safety system comprising pneumatic valve means connected to the output of each of said measuring valves, said pneumatic valve means being actuated upon a predetermined increase of lubricant in said outputs, means connecting said pneumatic valve means in series with each other, an air supply conected to said series of pneumatic valve means, and pneumatically operable indicating means connected to said pneumatic valve means for indicating an increase of a predetermined amount of pressure in the outputs of said measuring valves.

14. In a lubricating system including a plurality of measuring valves, each adapted to deliver lubricant to first and second outlets in response to pressure applied to said measuring valves, a supply of lubricant under pressure, pneumatically pilot operated valve means governing the connection of said supply to said measuring valves, an improved failure indicating system comprising pneumatic valve means connected to each first outlets of said measuring valves, second pneumatic valve means connected to each second outlets of the measuring valves, means for connecting each of said first pneumatic valve means in series with each other, said pneumatic valve means being operable responsive to a predetermined increase in lubricant pressure, means for connecting each of said second pneumatic valve means in series with each other, an air supply connected to each of said series of pneumatic valve means and pneumatically operable indicating means connected to each series of pneumatic valve means for indicating an increase of a predetermined amount of pressure in said first and second outputs of the measuring valves.

15. In a lubricating system including a plurality of lubricant dispensers, a central lubricant source, and pressure means for distributing lubricant simultaneously to certain of said dispensers, an improved safety system comprising a plurality of valve means connected to said dispensers and operable responsive to lubricant pressure, an energy source, means for series connecting said valve means to said energy source and indicating means connected to the series connected valve means and operable responsive to the receipt of energy through the series connected valve means for indicating the operation of said distributing means.

16. Apparatus for supplying lubricant to dispensers from a lubricant supply source comprising means for distributing lubricant to certain of the dispensers simultaneously, means for cyclically controlling the flow of lubricant from said source to said dispensers, a plurality of valve means connected to said dispensers each operable responsive to the distribution of lubricant to one of said certain dispensers, an air source, means for series connecting said valve means to said air source, and indicating means connected to the series connected valve means and operably responsive to the receipt of air from the series connected valve means for indicating the operation of said apparatus.

References Cited in the file of this patent

UNITED STATES PATENTS

| | | |
|---|---|---|
| 2,563,765 | Wedeberg | Aug. 7, 1951 |
| 2,855,069 | Graves | Oct. 7, 1958 |